United States Patent
Imai et al.

(10) Patent No.: US 6,460,514 B1
(45) Date of Patent: Oct. 8, 2002

(54) METHOD AND APPARATUS FOR CONTROLLING FUEL INJECTION QUANTITY FOR AN INTERNAL COMBUSTION ENGINE EQUIPPED WITH A TURBOCHARGER

(75) Inventors: Yoshinari Imai; Yasutaka Ishibashi, both of Ageo (JP)

(73) Assignee: Nissan Diesel Motor Co., Ltd. (JP)

( * ) Notice: Subject to any disclaimer, the term of this patent is extended or adjusted under 35 U.S.C. 154(b) by 0 days.

(21) Appl. No.: 09/700,772
(22) PCT Filed: Mar. 31, 2000
(86) PCT No.: PCT/JP00/02110
§ 371 (c)(1),
(2), (4) Date: Jan. 16, 2001
(87) PCT Pub. No.: WO00/58615
PCT Pub. Date: Oct. 5, 2000

(30) Foreign Application Priority Data

Mar. 31, 1999 (JP) ............................................. 11-094426

(51) Int. Cl.$^7$ ............................................. F02M 51/00
(52) U.S. Cl. ..................... 123/479; 123/684; 123/690
(58) Field of Search ................................ 123/479, 490, 123/690, 684

(56) References Cited

U.S. PATENT DOCUMENTS 4,748,567 A * 5/1988 Sumizawa et al. .......... 123/479
5,309,883 A * 5/1994 Pischke ........................ 123/479
5,384,707 A * 1/1995 Kerns et al. ................. 123/479
5,505,179 A * 4/1996 Brennan ....................... 123/479

FOREIGN PATENT DOCUMENTS

| JP | 05-171947 | 7/1993 |
| JP | 07-208230 | 8/1995 |
| JP | 08-100691 | 4/1996 |
| JP | 10-068327 | 3/1998 |

* cited by examiner

Primary Examiner—Erick Solis
(74) Attorney, Agent, or Firm—Lawrence E. Laubscher, Jr.

(57) ABSTRACT

It is checked whether or not a supercharged pressure Pb becomes equal to or greater than a predetermined value $P_0$ to judge whether or not a mechanism for adjusting the supercharged pressure is failed. When it is judged that the mechanism for adjusting the supercharged pressure is not failed, the fuel injection quantity Tp of normal time is computed based upon the engine operation condition. When it is judged that the mechanism for adjusting the supercharged pressure is failed, on the other hand, the fuel injection quantity Tp of failed time is computed, which is smaller than the fuel injection quantity of normal time. The fuel injection is then controlled based upon either the computed fuel injection quantity Tp of normal time or the computed fuel injection quantity Tp of failed time. In case the mechanism for adjusting the supercharged pressure is failed, therefore, the fuel injection quantity is decreased to decrease the torque that is produced, to thereby control the supercharged pressure to be less than an allowable upper limit.

6 Claims, 6 Drawing Sheets

METHOD AND APPARATUS FOR CONTROLLING FUEL INJECTION QUANTITY FOR AN INTERNAL COMBUSTION ENGINE EQUIPPED WITH A TURBOCHARGER

FIELD OF THE INVENTION

The present invention relates to technology for controlling a fuel injection quantity for an internal combustion engine equipped with a turbocharger. More particularly, the invention relates to technology for suppressing a supercharged pressure not to exceed an allowable upper limit even if a mechanism for adjusting the supercharged pressure is failed.

BACKGROUND ART

There has been known an internal combustion engine equipped with a turbocharger having a waste gate valve for controlling the supercharged pressure as disclosed in Japanese Unexamined Patent Publication No. 10-68327. That is, the waste gate valve is disposed in a passage bypassing a turbine of the turbocharger, and is opened to release the pressure when the supercharged pressure becomes excessive, so that the supercharged pressure is controlled at an allowable upper limit or below. In a turbocharger of electronically controlled variable nozzle type for controlling the supercharged pressure using a variable vane incorporated therein, an actuator that opens or closes the vane is controlled to control the supercharged pressure at the allowable upper limit or below.

When the waste gate valve or the actuator is failed due to fixing, however, the supercharged pressure is likely to exceed the allowable upper limit to become excessive, causing a damage to the internal combustion engine. Therefore, a fail-safe mechanism equipped with a relief valve has been proposed, for reducing the supercharged pressure by releasing an intake air into the open air when the supercharged pressure exceeds the allowable upper limit.

However, the relief valve is a fail-safe mechanism which operates only when the waste gate valve or the like is failed, and is, at present, an expensive component which should be abolished if there is available any other alternative means from the standpoint of fierce cost competition of present days.

In view of the above-mentioned conventional problems, it is an object of the present invention to provide a device for controlling a fuel injection quantity and a method of controlling the fuel injection quantity for an internal combustion engine equipped with a turbocharger, in which the fuel injection quantity is controlled according to the supercharged pressure, so that the supercharged pressure will not exceed an allowable upper limit even if a pressure adjustment mechanism is failed.

DISCLOSURE OF THE INVENTION

In order to accomplish the above-mentioned object, a device for controlling a fuel injection quantity for an internal combustion engine with a turbocharger according to the present invention, comprises:

failure judgment means for judging whether or not a mechanism for adjusting a supercharged pressure is failed;

normal time fuel injection quantity computing means for computing a fuel injection quantity of normal time based upon the engine operation condition when it is judged that the adjustment mechanism is not failed;

failed time fuel injection quantity computing means for computing a fuel injection quantity of failed time smaller than the fuel injection quantity of normal time based upon the engine operation condition when it is judged that the adjustment mechanism is failed; and fuel injection control means for controlling the fuel injection based upon the computed fuel injection quantity of normal time or upon the computed fuel injection quantity of failed time.

On the other hand, a method of controlling a fuel injection quantity for an internal combustion engine with a turbocharger according to the present invention, comprises:

a failure judgment step of judging whether or a mechanism for adjusting a supercharged pressure is failed;

a normal time fuel injection quantity computing step of computing a fuel injection quantity of normal time based upon the engine operation condition when it is judged that the adjustment mechanism is not failed;

a failed time fuel injection quantity computing step of computing a fuel injection quantity of failed time smaller than the fuel injection quantity of normal time based upon the engine operation condition when it is judged that the adjustment mechanism is failed; and a fuel injection control step of controlling a fuel injection based upon the computed fuel injection quantity of normal time or upon the computed fuel injection quantity of failed time.

According to this constitution, when the mechanism for adjusting the supercharged pressure is not failed, the fuel injection quantity is controlled based upon the fuel injection quantity of normal time. Therefore, the fuel injection quantity is controlled in a customary manner, and a driver does not feel it incompatible.

When the mechanism for adjusting the supercharged pressure is failed, on the other hand, the fuel injection quantity is controlled based upon the fuel injection quantity of failed time smaller than the fuel injection quantity of normal time. That is, the fuel injection quantity of normal time smaller than the fuel injection quantity of failed time is used, whereby the torque decreases and the engine rotational speed decreases. Since an intake air flow rate decreases with a decrease in the engine rotational speed, the supercharged pressure decreases so that it becomes possible to control the supercharged pressure at an allowable upper limit or below. Accordingly, the relief valve that was so far essential as a fail-safe mechanism can be abolished and, hence, achieving the decrease of cost, decrease of weight and improvement of reliability.

Further, in the device of the present invention, further, it is desired that the failed time fuel injection quantity computing means comprises:

first fuel injection quantity computing means for computing a first fuel injection quantity of when an accelerator is fully opened based upon the engine operation condition;

second fuel injection quantity computing means for computing a second fuel injection quantity smaller than the fuel injection quantity of normal time based upon the engine operation condition; and fuel injection quantity selection means for selecting the smaller value between the first fuel injection quantity or the second fuel injection quantity as the fuel injection quantity of failed time.

In the method of the present invention, on the other hand, it is desired that the failed time fuel injection quantity computing step comprises:

a first fuel injection quantity computing step of computing a first fuel injection quantity of when an accelerator is fully opened based upon the engine operation condition;

a second fuel injection quantity computing step of computing a second fuel injection quantity smaller than the fuel injection quantity of normal time based upon the engine operation condition; and a fuel injection quantity selection step of selecting the smaller value between the first fuel injection quantity or the second fuel injection quantity as the fuel injection quantity of failed time.

According to the above constitution, the smaller value between the first fuel injection quantity of when the accelerator is fully opened or the second fuel injection quantity smaller than the fuel injection quantity of normal time is used as the fuel injection quantity of failed time. Accordingly, once the adjustment mechanism is failed, the supercharged pressure is controlled at the allowable upper limit or below while maintaining smooth acceleration performance without the need of judging the occurrence of fault thereafter.

Moreover, in the device of the present invention, it is desired that supercharged pressure detecting means for detecting a supercharged pressure is provided, and the failure judgment means judges that the adjustment mechanism is failed when the detected supercharged pressure becomes equal to or greater than a predetermined value.

On the other hand, in the method of the present invention, it is desired that a supercharged pressure detecting step of detecting a supercharged pressure is provided, and the failure judgment step judges that the adjustment mechanism is failed when the detected supercharged pressure becomes equal to or greater than a predetermined value.

According to the above constitution, the failure in the pressure adjustment mechanism is judged based upon the supercharged pressure. Therefore, when for example, a supercharged pressure detecting means such as supercharged pressure sensor or the like is already provided, any sensor is not needed to be newly provided making it possible to suppress a rise in cost.

In addition, in the device of the present invention, it is desired that the normal time fuel injection quantity computing means and the failed time fuel injection quantity computing means compute the fuel injection quantity of normal time and the fuel injection quantity of failed time, respectively, by making a reference to a map in which the fuel injection quantity with respect to the engine operation conditions has been set.

On the other hand, in the method of the present invention, it is desired that the normal time fuel injection quantity computing step and the failed time fuel injection quantity computing step compute the fuel injection quantity of normal time and the fuel injection quantity of failed time, respectively, by making a reference to a map in which the fuel injection quantity with respect to the engine operation conditions has been set.

According to the above constitution, the fuel injection quantity of normal time and the fuel injection quantity of failed time are computed by making a reference to a map, suppressing an increase in the burden of processing that accompanies the computation of the fuel injection quantity.

BRIEF DESCRIPTION OF DRAWINGS

FIG. 4 illustrates maps of the fuel injection quantities, wherein FIG. 4A illustrates a map used at the failed time and FIG. 4B illustrates a map used at the normal time;

BEST MODE FOR CARRYING OUT THE INVENTION

The present invention will be described in more detail with reference to the accompanying drawings.

Figure 1:
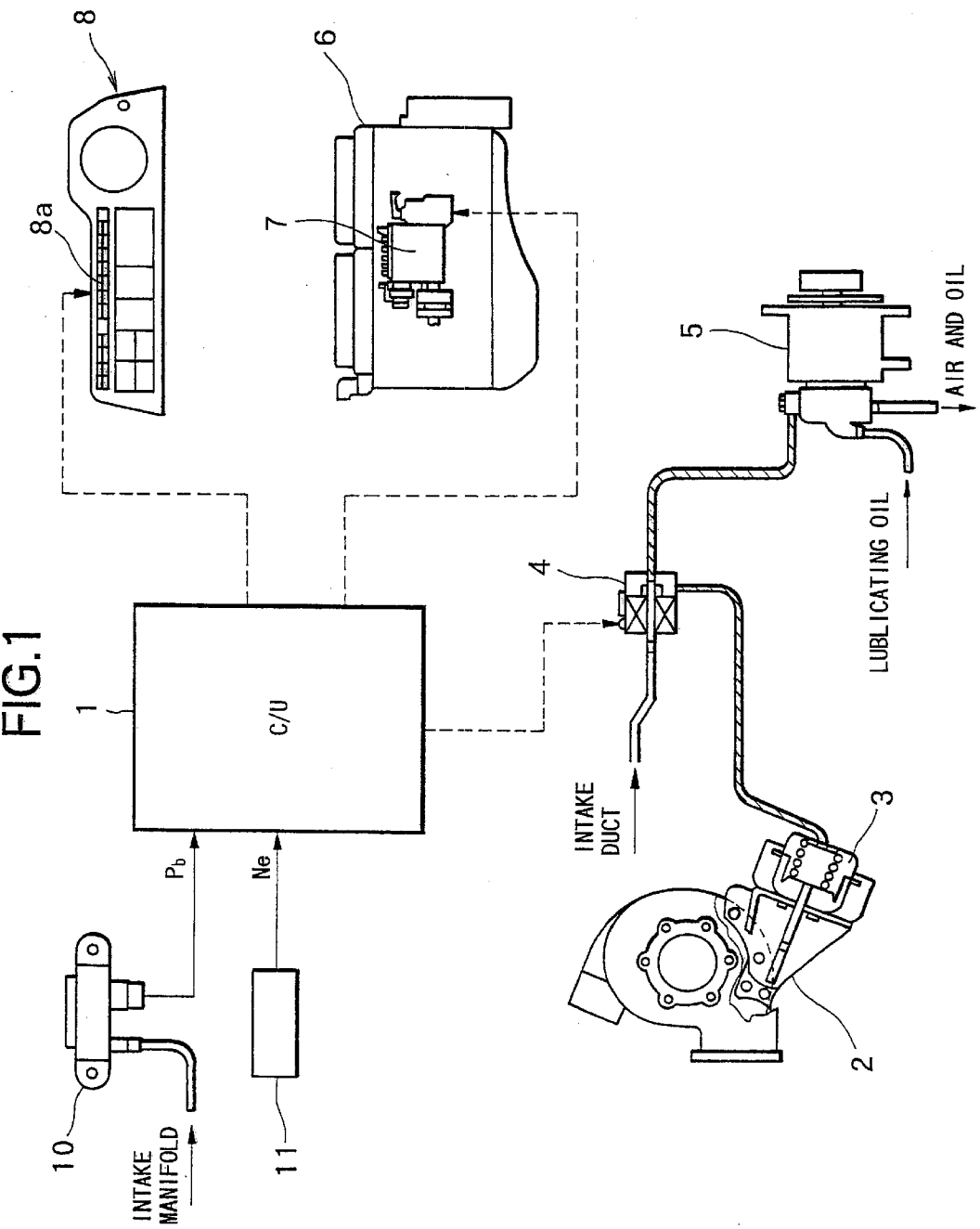
FIG. 1 is a diagram illustrating the whole constitution of an internal combustion engine equipped with a turbocharger having a device for controlling a fuel injection quantity according to the present invention.

FIG. 1 illustrates the whole constitution in which the present invention is applied to an internal combustion engine equipped with a turbocharger of electronically controlled variable nozzle type (hereinafter referred to as "turbocharger").

The turbocharger includes a control unit 1 for executing a main control, a turbocharger body 2 for controlling a supercharging amount by a variable vane incorporated therein, a pressure control modulator valve (hereinafter referred to as "PCM valve") 4 for supplying a negative pressure to an actuator 3 that opens and closes the vane, and a vacuum pump 5 producing the negative pressure serving as an operating source of the actuator 3. The control unit 1 receives outputs from a boost pressure sensor (supercharged pressure detecting means) 10 for detecting a supercharged pressure Pb and a rotational speed sensor 11 for detecting the engine rotational speed (hereinafter referred to as "rotational speed") Ne, respectively, as engine operation conditions.

The control unit 1 compares the detected engine operation condition with ideal supercharging characteristics, and electronically controls the PCM valve 4 in order to control the vane angle of the turbocharger body 2 so as to accomplish an optimum supercharging condition corresponding to the engine operation condition. The control unit 1, on the other hand, controls a fuel injection device 7 mounted on an internal combustion engine 6 according to the content of control that will be described later, in order to carry out increase/decrease control of fuel injection quantity in response to the control of turbocharger. Cluster meters 8 arranged in front of the driver's seat (not shown) is provided with an alarm lamp 8a that informs of any abnormal condition related to the turbocharger. When the turbocharger is detected to be abnormal, the alarm lamp 8a is controlled to turn on by the control unit 1.

Described below is how the supercharged pressure is controlled by the fuel injection quantity control when the supercharged pressure is no longer controlled by the opening or closing of the vane in the turbocharger body 2, for example, due to fixing of the actuator 3 and/or the PCM valve 4.

Figure 2:
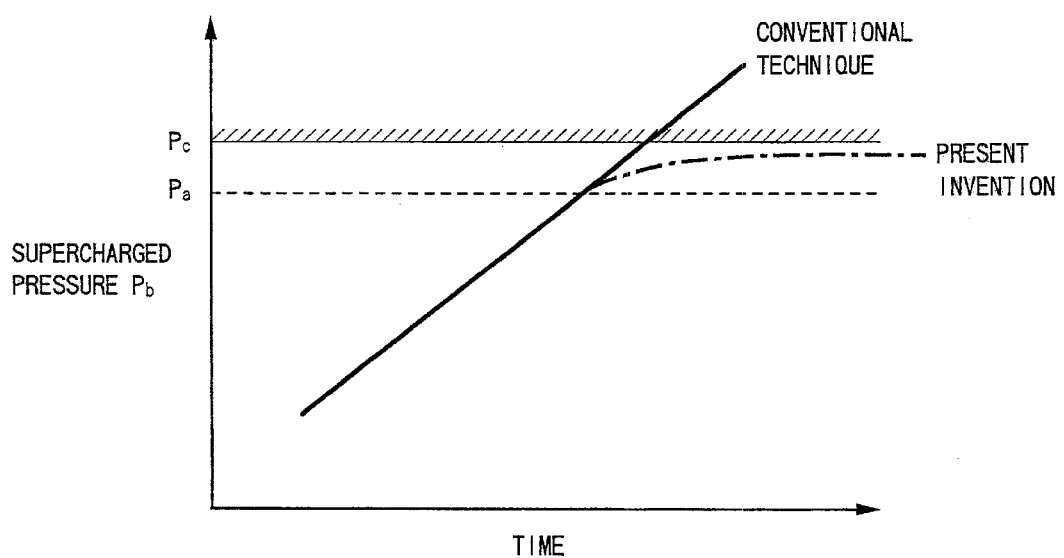
FIG. 2 is a graph illustrating rising characteristics of supercharged pressure according to conventional technique and the present invention.

When the supercharged pressure is no longer controlled by the turbocharger, then, the supercharged pressure Pb, for example, at the time of acceleration, rises with the time lapse and exceeds an allowable upper limit Pc as shown in FIG. 2. When such a phenomenon is likely to develop, a fuel injection quantity Tp to be set corresponding to the engine operation condition is decreased to decrease the torque T that is produced, to thereby decrease the supercharged pressure Pb. That is, when the supercharged pressure Pb is likely to exceed the allowable upper limit Pc, the fuel injection quantity Tp is decreased corresponding to the rotational speed Ne, so that the supercharged pressure Pb is controlled to the allowable upper limit or below.

Next, a first embodiment for controlling the fuel injection quantity will be described with reference to a flowchart of FIG. 3.

At step 1 (abbreviated as "S1" in the drawing, the same holds hereinafter), it is judged whether or not the supercharged pressure Pb detected by the boost pressure sensor 10 is equal to or greater than a predetermined value $P_0$. Here, the predetermined value $P_0$ is for judging whether or not the supercharged pressure is no longer controlled by the turbocharger, and is set to a value Pa less than the allowable upper limit Pc as shown in FIG. 2. When the supercharged pressure Pb is equal to or greater than the predetermined value $P_0$, the routine proceeds to step 2 (Yes), while when the supercharged pressure Pb is less than the predetermined value. $P_0$, the routine proceeds to step 4 (No). Here, the predetermined value $P_0$ may be a fixed value or a variable value changing depending upon the rotational speed Ne. When the predetermined value $P_0$ is a variable value, it is possible to enhance the precision for detecting a failure in the turbocharger. The processing at step 1 corresponds to failure judgment means.

Figure 4:
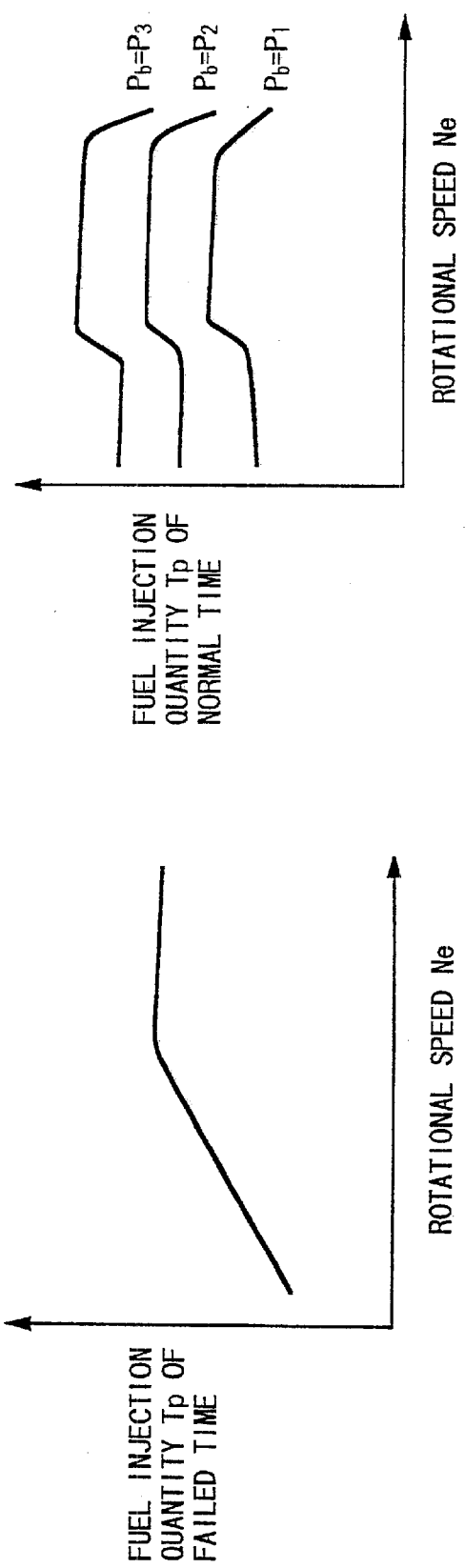

At step 2, the fuel injection quantity Tp is computed when a failure has occurred in the turbocharger (hereinafter referred to as "failed time"). That is, a reference is made to a map of fuel injection quantity shown in FIG. 4A, and the fuel injection quantity Tp of failed time is computed based upon the rotational speed Ne detected by the rotational speed sensor 11. In the map of fuel injection quantity, the fuel injection quantity Tp is set such that the supercharged pressure Pb is equal to or less than the allowable upper limit Pc relying upon the principle described above. The processing at step 2 corresponds to failed time fuel injection quantity computing means.

At step 3, the fuel injection device 7 is controlled based upon the fuel injection quantity Tp of failed time, to inject the fuel at a predetermined fuel injection timing. Here, the fuel injection quantity control based upon the fuel injection quantity Tp of failed time is continued until an ignition key is turned OFF, i.e., until a power source of the control unit 1 is turned OFF. The processing at step 3 corresponds to fuel injection control means.

When it is judged at step 1 that the supercharged pressure Pb is less than the predetermined value $P_0$, then at step 4, the fuel injection quantity Tp of when the turbocharger is not failed (hereinafter referred to as "normal time") is computed. That is, a reference is made to a map of fuel injection quantity shown in FIG. 4B to compute the fuel injection quantity Tp of normal time based upon the rotational speed Ne and the supercharged pressure Pb detected by the rotational speed sensor 11 and by the boost pressure sensor 10, respectively. The processing at step 4 corresponds to normal time fuel injection quantity computing means.

At step 5, the fuel injection device 7 is controlled based upon the fuel injection quantity Tp of normal time, and the fuel is injected at a predetermined fuel injection timing. The routine then returns back to step 1. The processing at step 5 corresponds to fuel injection control means.

According to the processing of steps 1 to 5 described above, the fuel injection quantity is controlled based upon the fuel injection quantity of normal time when the supercharged pressure Pb is less than the predetermined value $P_0$. When the supercharged pressure Pb is less than the predetermined value $P_0$, therefore, the fuel injection quantity is controlled in a customary manner, and the driver does not feel it incompatible.

When the supercharged pressure Pb becomes equal to or greater than the predetermined pressure $P_0$, on the other hand, it is judged to be the failed time where the supercharged pressure has no longer been controlled by the turbocharger. Accordingly, the fuel injection quantity is controlled based upon the fuel injection quantity Tp of failed time. In this case, the fuel injection quantity Tp of failed time is set to be smaller than the fuel injection quantity Tp of normal time under the same condition, such that the output torque decreases and the supercharged pressure Pb becomes equal to or less than the allowable upper limit Pc.

Therefore, even in case, for example, fixing has occurred in the actuator 3 and/or the PCM valve 4 and the vane in the turbocharger body 2 can not be controlled to open or close, it is possible to control the supercharged pressure Pb to be less than the allowable upper limit Pc as shown in FIG. 2. This makes it possible to abolish the relief valve that was indispensable in the conventional technique as a fail-safe mechanism and, hence, to decrease the cost. By abolishing the relief valve, further, the weight can be decreased and the reliability can be enhanced.

Next, a second embodiment for controlling the fuel injection quantity will be described with reference to a flow chart of FIG. 5.

At step 11, it is judged whether or not the supercharged pressure Pb detected by the boost pressure sensor 10 is equal to or greater than the predetermined value $P_0$. When the supercharged pressure Pb is equal to or greater than the predetermined value $P_0$, the routine proceeds to step 12 (Yes), while when the supercharged pressure Pb is less than the predetermined value $P_0$, the routine proceeds to step 18 (No). The predetermined value $P_0$ used here is the same as the predetermined value $P_0$ used at step 1 in the first embodiment, and the explanation thereof is omitted. The processing of step 11 corresponds to failure judgment means.

Figure 6:
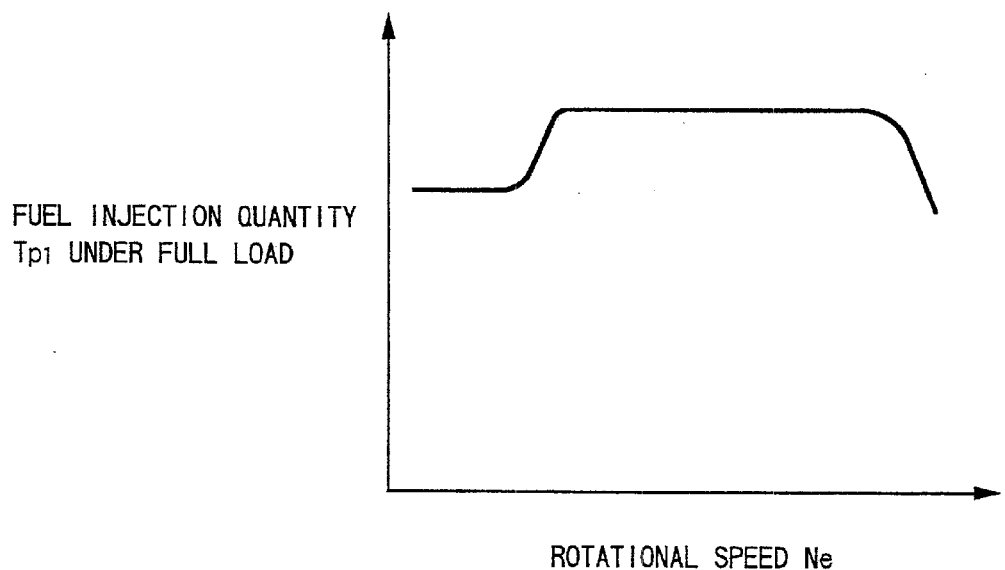
FIG. 6 is an explanatory diagram of a map of the fuel injection quantity under the full-load condition.

At step 12, the fuel injection quantity of normal time where the accelerator is fully opened (hereinafter referred to as the "fuel injection quantity under the full load") $Tp_1$ is computed. That is, a reference is made to a map of the fuel injection quantity shown in FIG. 6, and the fuel injection quantity $Tp_1$ under the full load is computed based upon the rotational speed Ne detected by the rotational speed sensor 11. The processing of step 12 corresponds to first fuel injection quantity computing means.

At step 13, there is executed the same processing as that of step 2 in the first embodiment to compute the fuel injection quantity Tp2 of failed time. The processing at step 13 corresponds to second fuel injection quantity computing means.

At step 14, it is judged whether or not the fuel injection quantity $Tp_1$ under the full load is equal to or greater than the fuel injection quantity $Tp_2$ of failed time. When the fuel injection quantity $Tp_1$ under the full load is equal to or greater than the fuel injection quantity $Tp_2$ of failed time, the routine proceeds to step 15 (Yes), where the fuel injection quantity $Tp_2$ of failed time is selected as the fuel injection quantity Tp. When the fuel injection quantity $Tp_1$ of under the full load is less than the fuel injection quantity $Tp_2$ of failed time, on the other hand, the routine proceeds to step 16 (No), where the fuel injection quantity $Tp_1$ under the full load is selected as the fuel injection quantity Tp. The processing through steps 14 to 16 corresponds to fuel injection quantity selection means.

Here, as a generic concept, the processing through steps 12 to 16 corresponds to failed time fuel injection quantity computing means.

At step 17, the fuel injection device 7 is controlled based upon the fuel injection quantity Tp to inject the fuel at a predetermined fuel injection timing. Here, the fuel injection quantity control based upon the fuel injection quantity Tp is continued until the ignition key is turned OFF, i.e., until the power supply of the control unit 1 is turned OFF. The processing at step 17 corresponds to fuel injection control means.

When it is judged at step 11 that the supercharged pressure Pb is less than the predetermined value $P_0$, then at step 18, the same processing as that of step 2 of the first embodiment is executed, and the fuel injection quantity Tp of normal time is computed at step 18 as the fuel injection quantity. The processing at step 18 corresponds to normal time fuel injection quantity computing means.

At step 19, the fuel injection device 7 is controlled based upon the fuel injection quantity Tp, and the fuel is injected at a predetermined fuel injection timing. Thereafter, the routine returns back to step 11 to repeat the processing at step 11 and at subsequent steps. The processing at step 19 corresponds to fuel injection control means.

According to the processing at steps 11 to 19 described above, the following functions and effects are exhibited in addition to the functions and effects of the above-mentioned first embodiment. That is, when the supercharged pressure Pb becomes equal to or greater than the predetermined value $P_0$ after the start of fuel injection quantity control, the smaller value between the fuel injection quantity Tp, under the full load or the fuel injection quantity $Tp_2$ of failed is selected as the fuel injection quantity Tp. Then, the fuel injection quantity is controlled based upon the fuel injection quantity Tp. Thereafter, the judgment whether or not the supercharged pressure Pb is equal to or greater than the predetermined value $P_0$ is not made, and the fuel injection quantity control of failed time is repeated. This is because, when the supercharged pressure Pb becomes equal to or greater than the predetermined value $P_0$, since it can be judged that the turbocharger is failed, it is intended to highly accurately control the fuel injection quantity of failed time.

Therefore, once the turbocharger is failed, the fuel injection quantity control of failed time is executed even if the supercharged pressure Pb is less than the predetermined value $P_0$. By suitably setting the map of fuel injection quantity (see FIG. 6) for computing the fuel injection quantity Tp1 under the full load, therefore, it is possible to control the supercharged pressure Pb to be equal to or less than the allowable upper limit while maintaining smooth acceleration performance even in case the turbocharger is failed.

Figure 3:
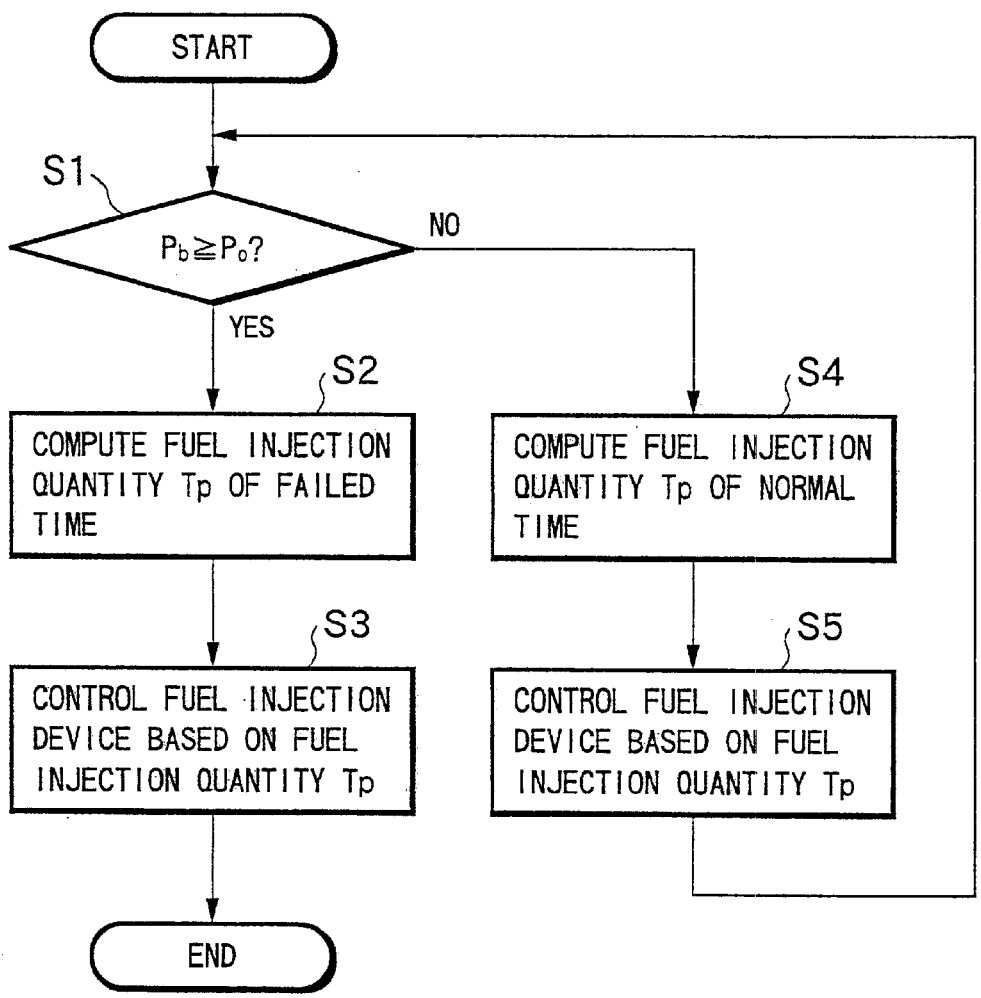
FIG. 3 is a flowchart showing the control of the fuel injection quantity according to a first embodiment.
Figure 5:
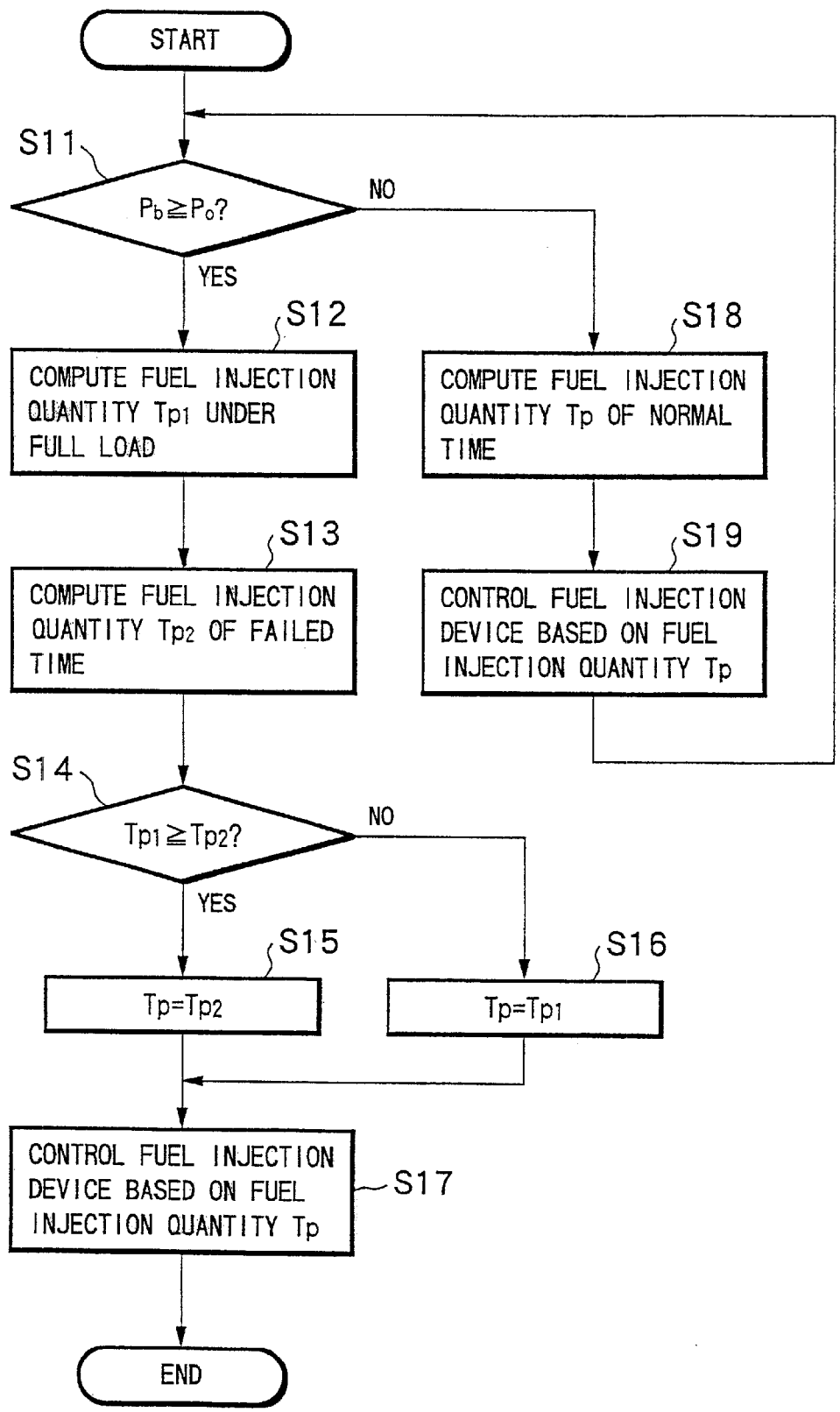
FIG. 5 is a flowchart showing the control of the fuel injection quantity according to a second embodiment.

Here, at steps 8 and 17 in the flowcharts of FIGS. 3 and 5, the fuel injection quantity control based upon the fuel injection quantity Tp is continued until the power source of the control unit 1 is turned OFF, to thereby exhibit an effect in that secondary inconvenience such as fluctuation in the torque can be prevented.

In the above-mentioned embodiment, the device for controlling a fuel injection quantity according to the present invention was applied to the internal combustion engine equipped with a turbocharger of electronically controlled variable nozzle type. The device for controlling a fuel injection quantity of the present invention, however, may be applied to an internal combustion engine equipped with an ordinary turbocharger having a waste gate valve. In this case, the supercharged pressure can be controlled by a reduction in the fuel injection quantity even when the waste gate valve does not operate due to fixing or the like and, hence, a relief valve as a fail-safe mechanism can be abolished.

It is further allowable to indirectly detect the supercharged pressure Pb from, for example, an intake air flow rate Q, instead of directly detecting the supercharged pressure Pb.

Industrial Applicability

As described above, the device for controlling a fuel injection quantity and the method of controlling a fuel injection quantity for an internal combustion engine equipped with a turbocharger of the present invention, make it possible to prevent the supercharged pressure from exceeding the allowable upper limit even when the mechanism for adjusting the supercharged pressure is failed, and are very useful.

What is claimed is:

1. A device for controlling a fuel injection quantity for an internal combustion engine equipped with a turbocharger, comprising:
    (a) failure judgment means for judging whether or not a mechanism for adjusting a supercharged pressure is failed;
    (b) normal time fuel injection quantity computing means for computing a fuel injection quantity of normal time based upon the engine operation condition when it is judged that the adjustment mechanism is not failed;
    (c) failed time fuel injection quantity computing means for computing a fuel injection quantity of failed time smaller than the fuel injection quantity of normal time based upon the engine operation condition when it is judged that the adjustment mechanism is failed, said failed time fuel injection quantity computing means including
        (1) first fuel injection quantity computing means for computing a first fuel injection quantity of when an accelerator is fully opened based upon the engine operation condition;
        (2) second fuel injection quantity computing means for computing a second fuel injection quantity smaller than the fuel injection quantity of normal time based upon the engine operation condition; and
        (3) fuel injection quantity selection means for selecting the smaller value between the first fuel injection quantity and the second fuel injection quantity as the fuel injection quantity of failed time; and
    (d) fuel injection control means for controlling the fuel injection based upon the computed fuel injection quantity of normal time or upon the fuel injection quantity of failed time.

2. A device for controlling a fuel injection quantity for an internal combustion engine equipped with a turbocharger according to claim 1, wherein there is provided supercharged pressure detecting means for detecting a supercharged pressure, and said failure judgment means judges that said adjustment mechanism is failed when the detected supercharged pressure becomes equal to or greater than a predetermined value.

3. A device for controlling a fuel injection quantity for an internal combustion engine equipped with a turbocharger according to claim 1, wherein said normal time fuel injection quantity computing means and said failed time fuel injection quantity computing means compute the fuel injection quantity of normal time and the fuel injection quantity of failed time, respectively, by making a reference to a map in which the fuel injection quantity with respect to the engine operation conditions has been set.

4. A method of controlling a fuel injection quantity for an internal combustion engine equipped with a turbocharger, comprising:

(a) a failure judgment step of judging whether or not a mechanism for adjusting a supercharged pressure is failed;

(b) normal time fuel injection quantity computing step of computing a fuel injection quantity of normal time based upon the engine operation condition when it is judged that the adjustment mechanism is not failed;

(c) failed time fuel injection quantity computing step of computing a fuel injection quantity of failed time smaller than the fuel injection quantity of normal time based upon the engine operation condition when it is judged that the adjustment mechanism is failed, said failed time fuel injection quantity computing step including (1) a first fuel injection quantity computing step of computing a first fuel injection quantity of when an accelerator is fully opened based upon the engine operation condition;

(2) a second fuel injection quantity computing step of computing a second fuel injection quantity smaller than the fuel injection quantity of normal time based upon the engine operation condition; and (3) a fuel injection quantity selection step of selecting the smaller value between the first fuel injection quantity and the second fuel injection quantity as the fuel injection quantity of failed time; and (d) fuel injection control step of controlling the fuel injection based upon the computed fuel injection quantity of normal time or upon the fuel injection quantity of failed time.

5. A method of controlling a fuel injection quantity for an internal combustion engine equipped with a turbocharger according to claim 4, wherein there is provided a supercharged pressure detecting step of detecting a supercharged pressure, and said failure judgment step judges that the adjustment mechanism is failed when the detected supercharged pressure becomes equal to or greater than a predetermined value.

6. A method of controlling a fuel injection quantity for an internal combustion engine equipped with a turbocharger according to claim 4, wherein said normal time fuel injection quantity computing step and said failed time fuel injection quantity computing step compute the fuel injection quantity of normal time and the fuel injection quantity of failed time, respectively, by making a reference to a map in which the fuel injection quantity with respect to the engine operation conditions has been set.

* * * * *